United States Patent [19]

Overman et al.

[11] 4,337,891
[45] Jul. 6, 1982

[54] ELECTRIC CONTROL DEVICE FOR A CENTRAL HEATING BOILER

[75] Inventors: Paulus T. J. Overman, Apeldoorn; Henricus J. Slats, Ugchelen, both of Netherlands

[73] Assignee: Veg-Gasinstituut N.V., Apeldoorn, Netherlands

[21] Appl. No.: 160,154

[22] Filed: Jun. 17, 1980

[30] Foreign Application Priority Data

Jun. 19, 1979 [NL] Netherlands ................. 7904801

[51] Int. Cl.³ ............................ F24D 3/00; F24D 5/10
[52] U.S. Cl. .................................. 236/9 A; 237/8 R; 237/63
[58] Field of Search ............. 236/9 A, 46 R; 237/8 R, 237/63; 62/158

[56] References Cited

U.S. PATENT DOCUMENTS 2,952,410  9/1960  MacKay ........................ 236/9 A X
4,094,166  6/1978  Jerles ............................... 62/158

FOREIGN PATENT DOCUMENTS 1054687  2/1957  Fed. Rep. of Germany .
2027949  2/1980  United Kingdom .

OTHER PUBLICATIONS

Hanboek Voor de Central, pp. 106–108, 1969.

*Primary Examiner*—William E. Wayner
*Attorney, Agent, or Firm*—Armstrong, Nikaido, Marmelstein & Kubovcik

[57] ABSTRACT

An electric control device for a central heating boiler which is provided with a water pump or an air ventilator (6), a burner with an electrically operated shut-off valve (5) and an electric control circuit comprising a supply transformer (1) and a series circuit connected to the secondary winding of said transformer and composed of the control winding (4) of the shut-off valve (5), the contact of a room or regulator thermostat (3) and, if present, the contact of a maximum thermostat (2) and in which the water pump or air ventilator (6) is connected in parallel with the primary winding of the supply transformer. The control device comprises a circuit to be connected to the contact of the room or regulator thermostat (3) including a high resistance value series resistor ($R_s$) to be connected into the mains supply circuit of the boiler, a relay (13) with a normally open contact (k) connected in parallel to said series resistor ($R_s$) and means (10,11,12) for controlling the relay (13) in such manner that the water pump or air ventilator is put into operation only upon the closing of the contact of the room or regulator thermostat and the opening of the contact of the maximum thermostat respectively through the closing of the contact (k) of the relay (13).

2 Claims, 1 Drawing Figure

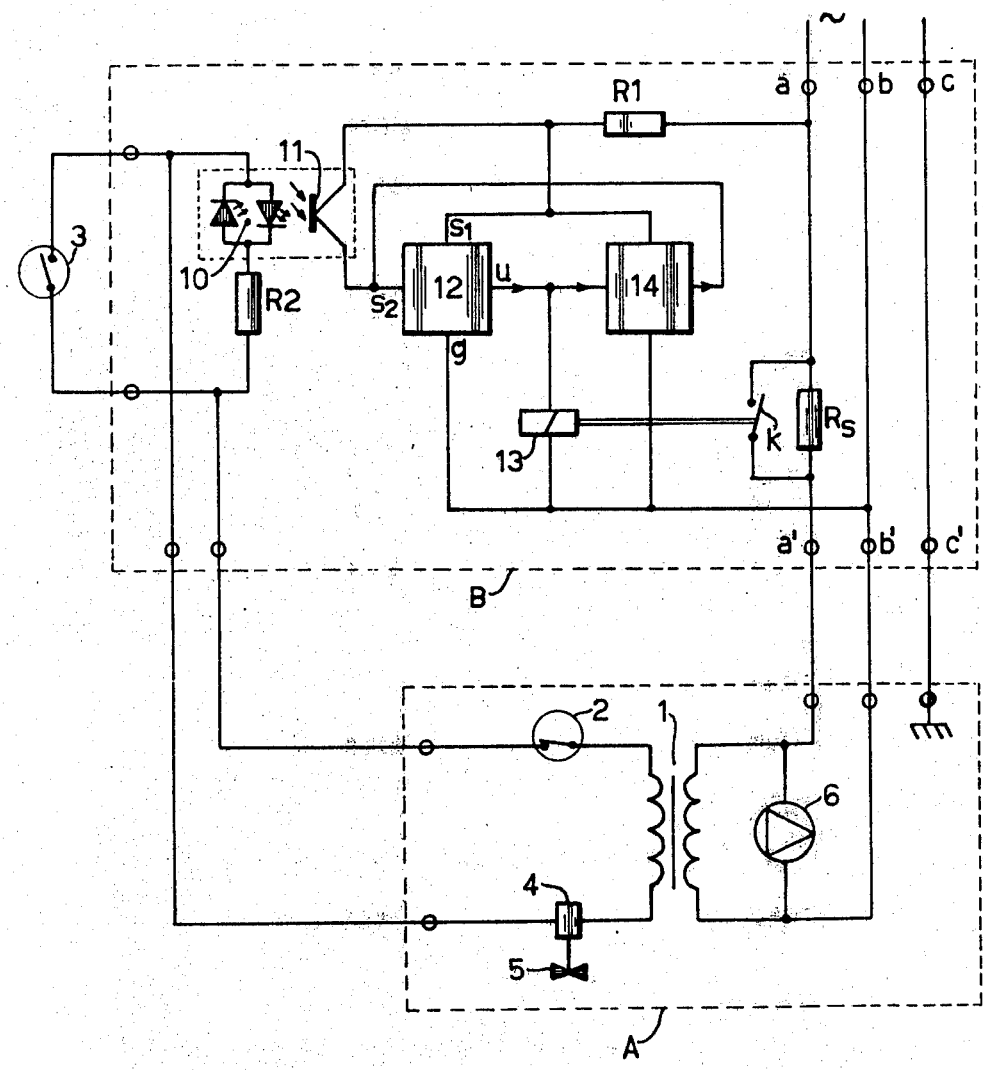

ELECTRIC CONTROL DEVICE FOR A CENTRAL HEATING BOILER

The invention relates to an electric control device for a central heating boiler which is provided with a water pump or an air ventilator, a burner, an electrically operated shut-off valve for controlling the fuel supply to the burner and an electric control circuit comprising a supply transformer, the primary winding of which can be connected to the mains voltage and a series circuit connected to the secondary winding of this transformer being composed of the control winding of the electrically operated shut-off valve, a room or regulator thermostat controlled contact and, if present, a maximum thermostat controlled contact and wherein the water pump or air ventilator is connected in parallel with the primary winding of the supply transformer.

Central heating boilers of the type described above have the drawback that the water pump of the air ventilator thereof is continuously operating, thereby consuming an unnecessary high amount of energy, while further this may cause a permanent annoying flow noise in the pipes and radiators or the air ducts of the heating system.

There also are known already central heating boilers in which the above drawbacks have been obviated by the inclusion in the series circuit connected to the secondary transformer winding of a so-called pump or ventilator relay and arranging in the supply circuit of the pump or ventilator a normally open contact operated by this relay and being closed upon the energizing thereof in response to the closing of the contact of the room thermostat so as to thereby activate the pump or ventilator and which contact upon opening of the room or regulator thermostat contact is opened again either instantly or with a predetermined time delay, whereby the pump or the ventilator wil be rendered inoperative again.

Although the electronic control circuit of an existing and possibly already installed central heating boiler with a continuously operating pump or ventilator can be equipped additionally with such pump or ventilator relay and an associated breaker contact this requires interfering with the internal wiring of the boiler which even when undertaken by a qualified expert will result in any official seal conferred on the boiler concerned becoming invalid.

Apart from this the application of an electric control circuit of the above type has the drawback that the energizing of the pump or ventilator relay also will be interrupted upon the opening of the maximum thermostat contact in response to an overheating of the boiler, whereby the pump or the ventilator will be rendered inoperative, whereas this is the exact opposite of what is desired in a situation of overheating.

The invention provides an electronic control device for a central heating boiler having a control circuit which does not include a relay for controlling the pump or the ventilator thereof which also offers the possibility of making the pump or ventilator of this boiler controllable, but at the same time has the advantage over the above-mentioned solution to this problem that to this end it is not necessary to interfere with the internal wiring of the boiler and further the drawback of the pump or ventilator being rendered inoperative upon overheating of the boiler is avoided thereby.

For these purposes the electronic control device according to the invention is provided with a circuit adapted to be installed externally of the boiler and to be connected to the mains supply voltage and the contact of the room or regulator thermostat and which circuit comprises a high resistance value series resistor to be connected into the connecting line of the mains supply with the primary transformer winding and the water pump or the air ventilator of the boiler as well as a relay having a normally open contact connected in parallel to this series resistor and further is arranged in such manner that whenever the room or regulator thermostat contact is closed and/or the maximum thermostat contact is opened the relay is energized and by short circuiting of the series resistor connected in parallel to the contact thereof the full mains supply voltage is applied to the pump or ventilator and the primary winding of the transformer, while after the opening of the room or regulator thermostat contact and when the maximum thermostat contact is closed the energizing of this relay and thereby the operation of the pump or the ventilator are maintained for a predetermined time.

In that the device according to the invention on one hand can be connected to the contact of the room or regulator thermostat being disposed externally of the boiler and on the other hand can be connected between the mains supply terminal of the boiler and a mains supply socket, by using this device there is no need to interfere with the internal wiring of the boiler, so that any seal conferred on the boiler will not be invalidated.

Since further the relay for controlling the pump or ventilator of the boiler included in the device according to the invention will be energized not only upon the closing of the contact of the room or regulator thermostat, but also upon the opening of the contact of the maximum thermostat with this device the pump or ventilator also will be activated in the case of overheating of the boiler and after the closing of the contact of the maximum thermostat will be kept in operation for a same predetermined time period as after the opening of the contact of the room or regulator thermostat.

The invention now will be described in more detailed with reference to the accompanying drawing showing a schematic diagram of the electric control circuit of a central heating boiler and a possible embodiment of the circuit arrangement of a control device according to the invention associated therewith.

Of the entire circuit illustrated in the drawing the part surrounded by the broken lines A is fitted in the boiler and the part depicted by the broken lines B is the circuit of the device according to the invention which can be installed at any suitable location outside of the boiler.

The control circuit of the boiler comprises a transformer 1, the primary winding of which can be connected to a mains supply voltage of for instance 220 Volts and a series circuit connected to the secondary winding of the transformer and including the normally closed contact of a maximum thermostat 2, the make contact of a room or regulator thermostat 3 and the control winding 4 of an electrically controlled shut-off valve 5 arranged in the fuel supply line of the burner of the boiler. The boiler further comprises a water pump or air ventilator 6 connected in parallel to the primary winding of the transformer 1. The transformer 1 may be arranged in a conventional manner so that by a supply voltage of 220 Volts a.c. applied to the primary winding thereof a voltage of 24 Volts a.c. is produced at its secondary winding.

The control device according to the invention in the embodiment illustrated in the drawing includes an arrangement 10 of two anti-parallel connected light emitting diodes, a phototransistor 11 optically coupled with these diodes, a time switching circuit 12, a pump or ventilator relay 13 with a normally open contact k and a resistor $R_s$ with a high resistance value of for instance 10 kOhms.

The device furthermore is provided with two terminals a and b for connecting the same to a mains supply voltage of for instance 220 Volts and two terminals a' and b' interconnected with these mains terminals and to which the mains supply lines of the boiler can be connected. The terminals b and b' are directly connected to each other, while the terminal a is connected with the terminal a' via the resistor $R_s$ and the contact k of the relay 13 connected in parallel to this resistor $R_s$. An earth connection is additionally provided by the interconnected terminals c and c'.

The time switching circuit 12 is provided with four terminals $s_1$, $s_2$, u and g of which the terminal $s_1$ is connected through a series resistor $R_1$ with the mains terminal a, the terminal $s_2$ is also connected to the mains terminal a through the emittercollector circuit of the phototransistor 11 and the resistor $R_1$ and the terminal u is connected through the relay 13 with the terminal g and the mains terminal b.

The arrangement 10 of the anti-parallel connected light emitting diodes is connected in series with a current limiting resistor $R_2$ in parallel to the contact of the room or regulator thermostat 3.

In the described circuit of the control device the arrangement 10 of the two light emitting diodes on one hand and the phototransistor 11 optically coupled therewith on the other hand at the same time provides for the required galvanic isolation between the 24 Volts' part of the control circuit of the boiler and the 220 Volts' part of the circuit of the control device.

The circuit of the control device is arranged in such manner that in the inoperative condition of the heating system in which the contact of the room or regulator thermostat 3 is opened the relay 13 is not energized and the contact k thereof connected in parallel to the resistor $R_s$ thus is opened. In this condition the resistor $R_s$ is connected in series with the pump or ventilator 6 of the boiler and as a result of the voltage drop across this resistor the voltage applied to the pump or ventilator is reduced to such value that only a small amount of energy will be consumed thereby. As a result of this reduced voltage also appearing at the primary winding of the transformer 1 connected in parallel to the pump or ventilator 6 a low voltage will remain present across the secondary winding of the transformer, whereby in the series circuit of the contact of the maximum thermostat 2, the current limiting resistor $R_2$, the arrangement 10 of the two light emitting diodes and the control winding 4 of the shut-off valve 5 associated therewith a current will continue to flow which by a suitable dimensioning of the resistor $R_2$ can be adjusted to a value being sufficiently high to activate the light emitting diodes, but too low to open or to keep opened the shut-off valve 5.

The phototransistor 11 is rendered conductive by the light of the light emitting diodes striking the same and thereby establishes a connection of the terminal $s_2$ of the time switching circuit 12 with the mains supply terminal a through the resistor $R_1$.

The time switching circuit 12 is so arranged that in this condition no voltage is produced across its terminals u and g, so that the relay 13 will not be energized.

If now a demand for heat occurs the contact of the room or regulator thermostat 3 in response to this heat demand will be closed thus short circuiting the series connection of the light emitting diodes and the current limiting resistor connected in parallel therewith, whereby the current flow through the diodes is terminated and the phototransistor 11 will no longer be illuminated by said diodes. As a result of this the connection of the terminal $s_2$ of the time switching circuit 12 with the mains supply terminal a will be interrupted and the time switching circuit 12 now further is arranged so that in response thereto a voltage will be produced across the terminals u and g of this circuit, whereby the relay 13 will be energized and the contact k thereof will be closed. By the closing of this last-mentioned relay contact the resistor $R_s$ is shortcircuited and the voltage across the parallel connection of the pump or ventilator 6 and the primary winding of the transformer 1 is increased to the value of the mains supply voltage. As a result of this on one hand the pump or ventilator 6 will be activated and on the other hand such high current will be produced in the series circuit connected to the secondary transformer winding that the shut-off valve 5 is opened and fuel is supplied to the burner of the boiler.

When the heat demand is terminated the contact of the room or regulator thermostat is opened again, whereby the arrangement 10 of the light emitting diodes and the current limiting resistor $R_2$ connected in series therewith once again is connected into the series circuit connected to the secondary winding of the transformer. This will result in the current flowing in this series circuit being reduced to a value at which the shutoff valve 5 is closed and the fuel supply to the burner is interrupted.

Further the phototransistor 11 will be illuminated again and thus become conductive, whereby the terminal $s_2$ of the time switching circuit 12 will be re-connected to the mains supply terminal a. The time switching circuit 12 now further is arranged so that after the returning of the voltage at the terminal $s_2$ the voltage across the terminals u and g will remain present for a predetermined time of for instance 10 minutes before being removed as a result of the circuit being restored to its inoperative condition and therefore the relay 13 will remain energized during this predetermined time period as well, so that the short-circuiting of the resistor $R_s$ by the contact k of this relay will be removed only after this time period has elapsed. Accordingly the pump or ventilator 6 of the boiler will continue to operate during this predetermined time period following to the opening of the contact of the room or regulator thermostat 3, thereby preventing a needless loss of heat in the boiler.

If due to a fault such as a failure of the shut-off valve 5 or of the room or regulator thermostat 3 the boiler is overheated to such extent that the contact of the maximum thermostat 2 opens this also will cause the interrupting of the current flow through the light emitting diodes and in response to this like in the case of the closing of the contact of the room or regulator thermostat 3 the pump or ventilator 6 is activated.

Since with central heating boilers comprising a water pump being controlled by the operation of a room or regulator thermostat there always is a danger that the pump becomes blocked by the impurities present in the boiler water, particularly during longer periods of inactivity such as during the summer season, usually with such boilers provisions are made for the pump to be also activated periodically for predetermined time periods independently of any heat demands signalled by the room or regulator thermostat.

A similar provision is also made with the control device of the present invention in the form of a time control circuit 14 connected to the time switching circuit 12 and being arranged so as to be activated in response to the output voltage of the circuit 12 dropping to zero to produce after a predetermined period of time such as for instance a period of 24 hours a signal at its output connected to the terminal $s_2$ of the circuit 12 by which this circuit is activated in the same manner as in the case that the phototransistor after the opening of the contact of the room or regulator thermostat 3 becomes conductive again.

The control device according to the invention also can be used with central heating boilers having a built-in or built-on domestic water heater since in this case the contact of the thermostat of this water heater is connected either in parallel or in series with the contact of the room or regulator thermostat so that the current flow through the light emitting diodes of the control device of the invention will be influenced by the opening and closing of the contact of this water heater thermostat in the same manner as by the opening and closing of the contact of the room or regulator thermostat and/or the contact of the maximum thermostat.

We claim:

1. An electric control device for a central heating boiler which is provided with a pump, a burner, an electrically operated shut-off valve for controlling the fuel supply to the burner and an electric control circuit comprising a supply transformer having a primary winding for connection to voltage mains and a series circuit connected to the secondary winding thereof, the series circuit including the control winding of the electrically operated shut-off valve, a first thermostat controlled contact and a maximum thermostat controlled contact and wherein the pump is connected in parallel with the primary winding of the supply transformer, characterized in that the device is provided with a circuit for external mounting on the boiler connected to the supply voltage mains and the contact of the first thermostat and said circuit comprising a high resistance value series resistor connected between the supply mains and the primary winding and the pump of the boiler, a relay having a normally open contact connected in parallel to the series resistor such that when at least one of the first thermostat and the maximum thermostat contacts changes state the relay is energized thereby short circuiting the series resistor connected in parallel to the contact thereof whereby the full supply voltage is applied to the pump and the primary winding of the transformer, and wherein when the first thermostat contact is open and the maximum thermostat contact is closed the energizing of the relay and thereby the operation of the pump is maintained for a predetermined time.

2. An electric control device as claimed in claim 1, characterized in that the circuit for controlling the pump connected with the contact of the first thermostat includes two parallel connected light emitting diodes connected for conduction in opposite directions, a current limiting resistor connected in series with the light emitting diodes, the light emitting diodes and the current limiting resistor being connected in parallel to the first thermostat contact, a phototransistor optically coupled with the diodes, connected to the supply mains and a time switching circuit connected in series with the phototransistor and the supply mains, wherein the relay for activating and de-activating the pump is connected to the output of the time switching circuit, the time switching circuit being energized in response to the extinction of the light emitting diodes in response to the change of state of at least one of the first contact and the contact of the maximum thermostat and wherein after the re-firing of the light emitting diodes in response to the opening of the first thermostat contact and the closing of the maximum thermostat contact, the relay is energized for a predetermined time.

* * * * *